(12) United States Patent
Lim et al.

(10) Patent No.: US 6,188,906 B1
(45) Date of Patent: Feb. 13, 2001

(54) METHOD FOR COVERAGE OPTIMIZATION OF MULTI-FREQUENCY ASSIGNMENT SYSTEM

(75) Inventors: Young-sik Lim, Sungnam; Pyeong-hwan Wee, Seoul, both of (KR)

(73) Assignee: Samsung Electronics Co., Ltd. (KR)

( * ) Notice: Under 35 U.S.C. 154(b), the term of this patent shall be extended for 0 days.

(21) Appl. No.: 09/224,233

(22) Filed: Dec. 30, 1998

(30) Foreign Application Priority Data

Dec. 30, 1997 (KR) .................................... 97-79027

(51) Int. Cl.[7] .................... H04Q 7/20; H04B 1/38
(52) U.S. Cl. .................. 455/453; 455/450; 455/522; 370/331
(58) Field of Search .................. 455/522, 63, 69, 455/452, 453, 450, 447, 437, 442, 436; 370/330, 331, 335, 320, 329

(56) References Cited

U.S. PATENT DOCUMENTS

| | | | |
|---|---|---|---|
| 4,639,914 | * 1/1987 | Winters | 370/334 |
| 5,551,057 | 8/1996 | Mitra | 455/33.1 |
| 5,594,718 | * 1/1997 | Weavers, Jr. et al. | 370/331 |
| 5,649,000 | 7/1997 | Lee et al. | 455/436 |
| 5,771,451 | 6/1998 | Takai et al. | 455/442 |
| 5,771,461 | 6/1998 | Love et al. | 455/52 |
| 5,781,861 | 7/1998 | Kang et al. | 455/442 |
| 5,859,839 | * 1/1999 | Ahlenius et al. | 370/252 |
| 5,982,759 | * 11/1999 | Jo et al. | 370/331 |
| 6,070,075 | * 5/2000 | Kim | 455/437 |
| 6,078,571 | * 6/2000 | Hall | 370/331 |
| 6,081,714 | * 6/2000 | Wakizaka | 455/437 |

\* cited by examiner

Primary Examiner—Reinhard J. Eisenzopf
Assistant Examiner—Charles N. Appiah
(74) Attorney, Agent, or Firm—Dilworth & Barrese, LLP

(57) ABSTRACT

A method for coverage optimization of a multi-frequency assignment communication system employing a dummy pilot channel, particularly a CDMA communication system. A first base station is configured to transmit communication signals to subscriber terminals using at least a first frequency allocation (FA#1) and a second frequency allocation (FA#2). A second base station transmits communication signals to subscriber terminals using FA#1 substantially more frequently than FA#2. The second base station has a dummy pilot at FA#2 which is used for handoff at FA#2. The method equalizes coverage in the first base station at FA#1 and FA#2 by transmitting the dummy pilot with less RF power than that for a pilot channel at FA#1 of the second base station, and sufficient to substantially equalize a handoff boundary between first and second cells at both FA#1 and FA#2 in an environment of more communication traffic and associated interference at FA#1 than at FA#2.

13 Claims, 3 Drawing Sheets

METHOD FOR COVERAGE OPTIMIZATION OF MULTI-FREQUENCY ASSIGNMENT SYSTEM

FIELD OF THE INVENTION

The present invention relates generally to wireless telecommunications and more particularly to a method for coverage optimization of a multi-frequency assignment (multi-FA) system.

DESCRIPTION OF THE RELATED ART

In a code division multiple access (CDMA) wireless communications system, a spread spectrum technique is employed which enables the same frequency spectrum to support multiple communication signals. The use of CDMA results in a much higher spectral efficiency than can be achieved using other multiple access techniques, thus permitting an increase in system user capacity.

Often, a CDMA base station uses only a single CDMA frequency band to support communications to subscriber stations within the cell. However, in a geographical area where a large volume of telephone traffic exists, such as in the center of a city, a multi-frequency assignment (multi-FA) method for accommodating a large number of subscribers is employed. With the multi-FA approach, two or more radio frequency (RF) channels are operated simultaneously, with each RF channel supporting multiple communication signals via CDMA. In practice, it is important to maintain approximately equal geographical coverage for the frequency assignments. In this manner, system resources per frequency assignment are used uniformly; hence, the subscriber load is distributed equally among the allocated frequency bands.

In the typical CDMA system, each base station transmits a unique pilot signal on a pilot channel (using the same frequency band as the associated traffic channels). The pilot signal is an unmodulated, direct sequence, spread spectrum signal transmitted continuously by each base station using a common pseudorandom noise (PN) spreading code. Each base station or base station sector transmits the common pilot sequence offset in time from the other base stations or sectors. The subscriber stations can identify a base station based on the code phase offset of the pilot signal that it receives from the base station. The pilot signal also provides a phase reference for coherent demodulation and the basis of the signal strength measurements used in handoff determination. In a multi-FA system, each frequency band has its own pilot channel. In practice, it is necessary to determine the power allocation for the pilot channel relative to the traffic channels.

Generally, the following tests are performed to maintain coverage for each frequency assignment in a multi-FA system:

1. Forward Link (base station to subscriber station):
   traffic channel calibration;
   determine output characteristics of transmit intermediate frequency (Tx IF) level;
   frequency accuracy test;
   pilot time error;
   time error between pilot channel and code channel;
   spurious measurement;
   total power measurement;
   pilot power measurement.
2. Reverse Link (subscriber station to base station):
   output characteristics of Receive (Rx) IF level;
   Automatic Gain Control (AGC) measurement;
   Rx IF cable test.

If the above tests satisfy a predetermined specification, coverage for the associated frequency assignment is maintained.

One method for maintaining equal coverage for each frequency assignment is as follows:
(1) At the base station, a transmit attenuator value, "Tx_Atten", is confirmed for a first frequency assignment FA#1 of each sector in current operation. (The value of Tx_Atten controls adjustment of the transmit power level.);
(2) The output RF transmit power for FA#1 per each currently operated sector is measured;
(3) A value for Tx_Atten of a second frequency assignment, FA#2, is set equal to that for FA#1;
(4) The output RF transmit power for FA#2 per each sector is measured and equalized with the RF output of FA#1 by adjusting the value of Tx_Atten for FA#2;
(5) The final value for Tx_Atten of FA#2 is optimized; and
(6) The optimized value for Tx_Atten of FA#2 is output, e.g., to an operator who manages parameters of a base station manager (BSM).

For CDMA systems, the conventional optimization method outlined above is limited to the case in which there is a constant number of RF channels in all base stations.

For base stations that handle low traffic volume, such as those located in outer regions of a city, it is unnecessary to provide a large number of frequency assignments. However, a handoff problem may occur between adjacent base stations that have a different number of frequency assignments. For example, assume that two base stations A and B are adjacent, FA#1 and FA#2 are being used in base station A and only FA#1 is being used in base station B. A mobile station can not search the pilot of base station B when the mobile station is tuned to FA#2 of base station A. As a result, when this mobile station is traveling towards base station B, a handoff to base station B can not be performed (absent methodology to handle this situation) and it is highly probable that the call will be dropped due to the link deterioration. To address this problem, a base station handling low traffic volume as in the above case may adopt a method that utilizes a pilot channel for handoff, rather than a traffic channel. Such a frequency assignment is sometimes referred to as a dummy frequency assignment. The "dummy pilot channel" used for this handoff is within the dummy frequency assignmnt, which is an unused frequency band of the low traffic volume base station (e.g., within FA#2 in the above example).

A similar handoff problem is addressed in U.S. Pat. No. 5,649,000, which discloses a method for providing a different frequency handoff in a CDMA cellular telephone system. A mobile unit measures the strength of all pilot signals emanating from surrounding base stations. A different frequency handoff is initiated by the mobile unit when all pilot signals are lower than a threshold, or is initiated by a system controller with consideration given to the frequency band occupation state of surrounding base stations and the strength information reported from the mobile unit.

SUMMARY OF THE INVENTION

The present invention is intended to provide a method for optimizing the geographical coverage for each frequency assignment of a multi-frequency assignment wireless communications system employing a dummy pilot. The coverage is optimized by equalizing handover boundaries for each frequency assignment between adjacent base stations, even when the base stations have a different number of frequency assignments. In this manner, the subscriber load among the frequency bands is equally distributed, so that system resources per FA are used in a more uniform manner. The method is particularly advantageous for a multi-FA CDMA system.

In an illustrative embodiment of the present invention, there is provided a method for uniformly using the system resources of each frequency assignment of a multi-FA wireless communications system employing a dummy pilot channel. The communications system includes a first base station configured to transmit communication signals to subscriber terminals using at least a first frequency allocation (FA#1) and a second frequency allocation (FA#2). A second base station transmits communication signals to subscriber terminals using FA#1 substantially more frequently than FA#2. The second base station has a dummy pilot at FA#2 which is used for handoff at FA#2. The method equalizes coverage in the first base station at FA#1 and FA#2 by transmitting the dummy pilot with less RF power than that of a pilot channel at FA#1 of the second base station. The dummy pilot RF power is sufficient to substantially equalize a handoff boundary between first and second cells at both FA#1 and FA#2 in an environment of more communication traffic and associated interference at FA#1 than at FA#2.

BRIEF DESCRIPTION OF THE DRAWINGS

For a better understanding of the present invention, reference is made to exemplary embodiments thereof, taken in conjunction with the accompanying drawings in which like reference numerals denote similar or identical features, wherein.

DESCRIPTION OF THE PREFERRED EMBODIMENTS

A preferred embodiment of the invention will now be described in the context of a CDMA wireless communication system. The invention, however, may be practiced in other types of systems such as frequency division multiple access (FDMA) and time division multiple access (TDMA) systems.

Figure 1:
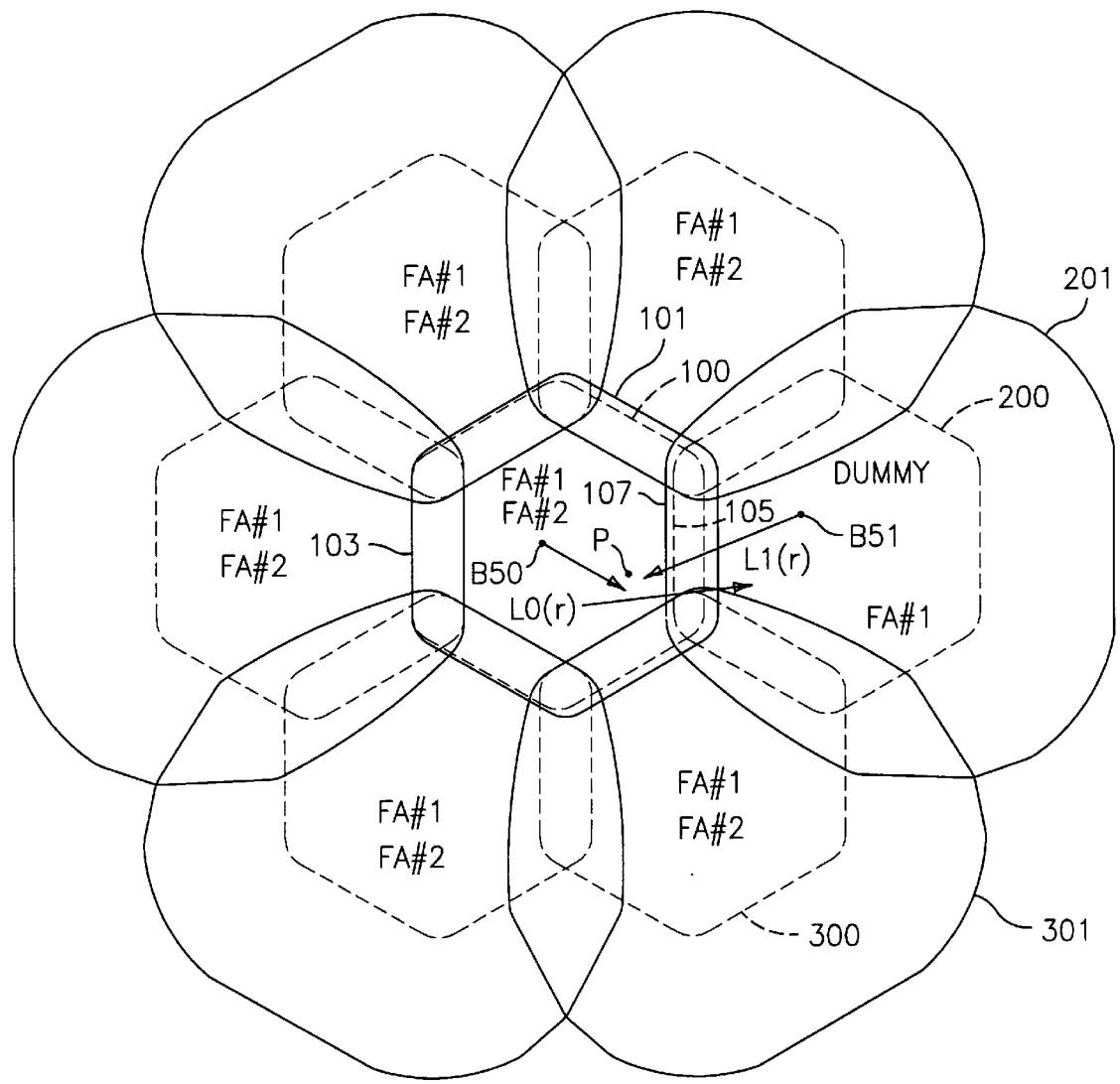
FIG. 1 illustrates a cell arrangement and associated handoff regions for a wireless communications system.

Referring to FIG. 1, a cell arrangement for a CDMA wireless communications system in shown. Mobile subscriber stations within each basic hexagonal cell such as 100, 200 are serviced by an associated base station as BS0, BS1. The overlapping areas between the cells represent soft handoff regions. The geographical regions defined by the solid lines such as 101, 201, 301 represent expanded coverage areas. In the example shown, all base stations except for base station BS1 of cell 200 support frequency assignments FA#1 and FA#2; base station BS1 uses only FA#1. Base station BS1 also includes a dummy pilot channel at FA#2 to support handoffs from base stations using FA#2.

If the same amount of power is allocated to the pilot channels of FA#1 and FA#2 of base station BS0 and to the dummy pilot channel of base station BS1, the cell area 100 for FA#2 may be increased (to area 101) compared to that for FA#1. The reason for this increase is that, since there is no traffic channel for FA#2 in base station BS1 (aside from the dummy pilot channel), the interference-effect of using FA#2 is less than the interference-effect of using FA#1. Therefore, as illustrated in FIG. 1, assuming that: 1) the soft handoff area of FA#2 is increased; 2) a mobile station moves from cell 100 to cell 200; and 3) mobile stations using FA#1 and FA#2 use the same handoff parameters, then the mobile station using FA#2 requests a handoff earlier than the mobile station using FA#1. That is, the mobile station using FA#2 requests a handoff at boundary line 107 whereas if FA#1 is being used, the handoff request occurs at boundary 105. Consequently, the loading of FA#1 of base station BS0 is increased relative to the loading of FA#2.

In accordance with the invention, such disparate loading is prevented by equalizing the handoff area of FA#2 to the handoff area of FA#1. This is accomplished by base station BS1 transmitting the dummy pilot (at FA#2) with less RF power than for the actual pilot at FA#1. On the other hand, base station BS0 transmits its pilots at FA#1 and FA#2 with the same RF power. As a result, a subscriber traveling in cell 100 towards cell 200 will begin handoff at about the same point, regardless of which frequency assignment he is using.

An exemplary method of determining a dummy pilot power allocation ratio will now be described. The method entails calculating path losses representing service areas at FA#1 and FA#2 for the base station employing the dummy pilot. By setting these computed path losses equal to one another, an optimum value for the dummy pilot power allocation ratio is determined which equalizes the handoff starting boundaries. In FIG. 1, assuming that a mobile station at point P is traveling from cell 100 to cell 200, where P is a distance r from base station BS0 and a distance r' from base station BS1, the path loss to BS0 is designated as L0(r) and the path loss to base station BS1 is designated as L1(r').

The service area of the forward link of base station BS1 in cell 200 (or 201) for FA#1 is represented in the form of path loss $L(r_{(FA1,1)})$ in accordance with the following expression:

$$L(r_{(FA1,1)}) = \frac{\left(\frac{E_c}{I_t}\right)N_0W}{P_tG_cG_m\left[\xi_{pilot,(FA1,1)} - \left(\frac{E_c}{I_t}\right)\left(\frac{1}{F_1} - \xi_{pilot,(FA1,1)}\right)\right]} \quad (1)$$

where, $F_1$ is the frequency reuse efficiency at a distance r from base station BS1 for FA#1, $P_t$ is total base station transmit power, $G_C$ is base station antenna gain including feeder line cable loss, $G_M$ is mobile station antenna gain including feeder line cable loss, $E_C$ is energy per chip code, $I_t$ is total interference as a summation of common cell interference, other cell interference and background noise, $N_0$ is thermal noise density, W is channel bandwidth, $\xi_{(pilot(FA1,1))}$ is a ratio of power allocated to the pilot channel for FA#1 in base station BS1 relative to the total base station transmit power $P_t$, and $E_C/I_t$ is the strength of the pilot channel signal (for FA#1 transmitted by base station BS1) received by a mobile station for a pilot channel power allocation ratio of $\xi_{pilot(FA1,1)}$.

The service area of the forward link of base station BS1 for FA#2 is represented in the form of path loss $L(r_{(FA2,1)})$ in accordance with the following expression:

$$L(r_{(FA2,1)}) = \frac{\left(\frac{E_c}{I_t}\right)N_0 W}{P_t G_c G_m \left[\xi_{pilot,(FA2,1)} - \left(\frac{E_c}{I_t}\right)(\xi_{pilot,(FA2,1)} + \xi_{paging} + \xi_{sync})\left(\frac{1}{F_2}\right) + \left(\frac{E_c}{I_t}\right)\xi_{pilot,(FA2,1)}\right]} \quad (2)$$

where, $F_2$ is the frequency reuse efficiency at a distance r from base station BS1 for FA#2, $\xi_{pilot,(FA2,1)}$ is a ratio of power allocated to the pilot channel for FA#2 in base station BS1 relative to the total base station transmit power $P_t$.

$E_C/I_t$ is the strength of the pilot channel signal (i.e., the dummy pilot signal, which is for FA#2 transmitted by base station BS1) received by a mobile station for a pilot channel power allocation ratio of $\xi_{pilot(FA2,1)}$, and the other parameters are as defined above in reference to eqn. (1).

Therefore, the value of $\xi_{pilot(FA2,1)}$ to satisfy the condition of $L(r_{(FA1,1)})=L(r_{(FA2,1)})$ can be expanded as the following expression:

$$\xi_{pilot,(FA2,1)} = \frac{\left(1 + \frac{E_c}{I_t}\right)\xi_{pilot,(FA1,1)} - \left(\frac{E_c}{I_t}\right)\left(\frac{1}{F_1} - \frac{1}{F_2}\right)(\xi_{paging} + \xi_{sync})}{1 + \frac{E_c}{I_t} - \frac{E_c}{I_t} \cdot \frac{1}{F_2}} \quad (3)$$

where $E_C/I_t$ is the strength of the dummy pilot channel signal, and the other parameters are as defined above.

Therefore, the power allocation ratio for the dummy pilot is determined by the threshold value of $E_C/I_t$ and the values of $F_1$ and $F_2$ which suffice to make the handoff-starting area of FA#2 using the dummy pilot equal to that of FA#1.

The value of $\xi_{pilot(FA2,1)}$ can be derived by substituting the values of $F_1$ and $F_2$ in eqn. (3) at a position where the value of FA#1 is the threshold T_ADD. (In CDMA systems, when the RF communication signal power received by a mobile station falls below the threshold T_ADD, the mobile station is reported as a handover candidate.)

Now, the value of $F_2$ is varied according to the value of $\xi_{pilot(FA2,1)}$, so the value of $F_2$ is derived by substituting the value of $\xi_{pilot(FA2,1)}$. Then, repeating the calculation to find the value of $\xi_{pilot(FA2,1)}$ derives a convergent value. The convergent value of $\xi_{pilot(FA2,1)}$ derived from the above calculation is 0.121475 (for the specific case defined by the parameter values below).

An example of a system environment to calculate the ratio of power allocation for the dummy pilot of FA#2 as stated above is as follows.

(1) cell radius: 3000 m
(2) maximum transmit power of base station: 25 W
(3) ratio of pilot power allocation for FA#1: 0.15
(4) ratio of dummy paging power allocation for FA#1 and FA#2: $0.63 \times \xi_{pilot(FA1,1)} = 0.0945$
(5) ratio of sync power allocation for FA#1 and FA#2: $0.20 \times \xi pilot(FA1,1) = 0.30$
(6) T_ADD=−15 dB
(7) Full loading condition.

Figure 2:
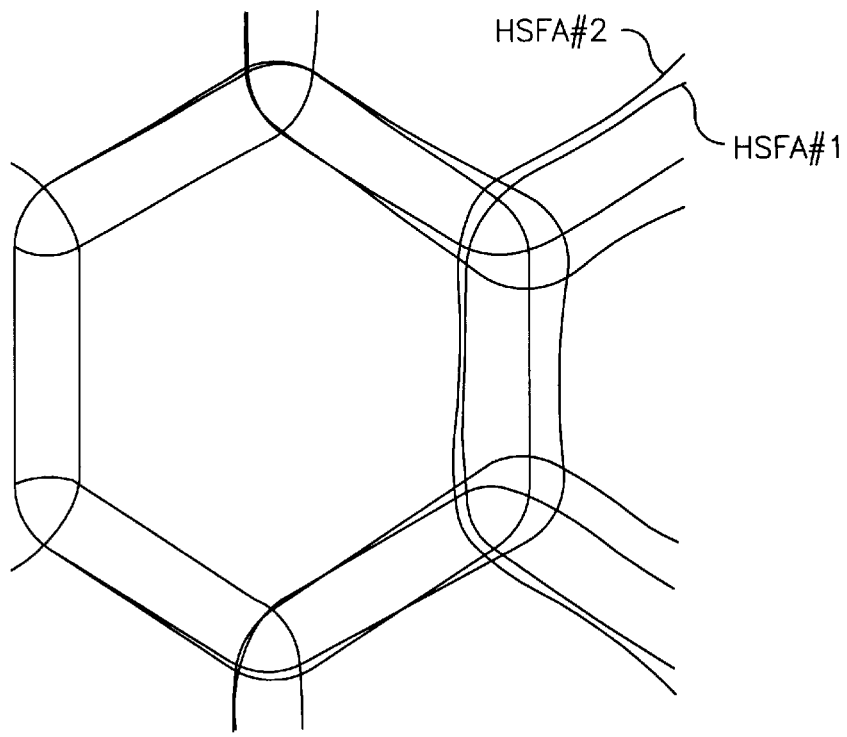
FIG. 2 illustrates a handoff-starting area for the case in which the ratio of power allocation to a dummy pilot is 0.15.
Figure 3:
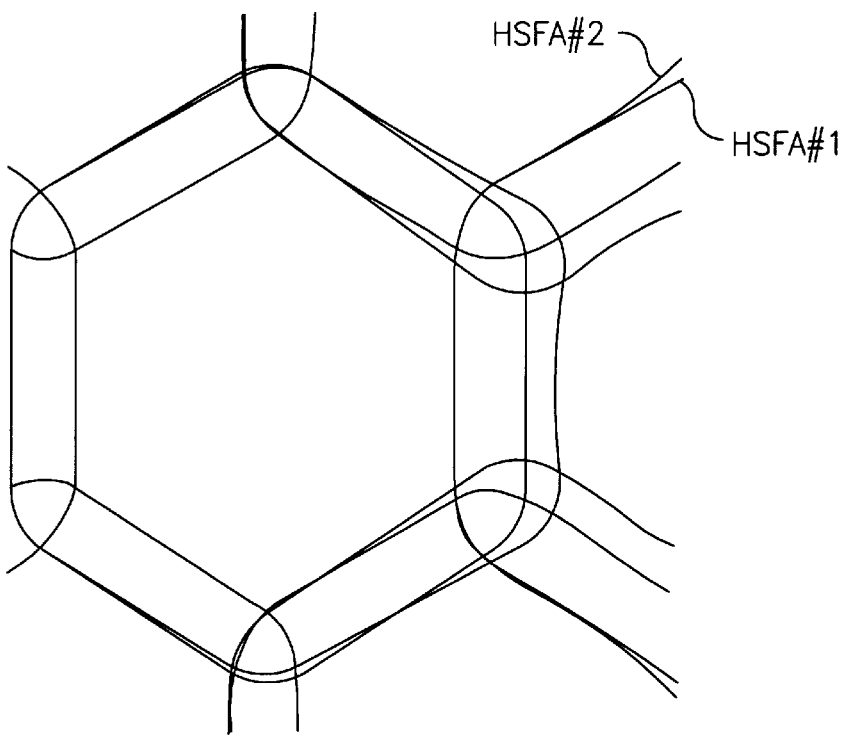
FIG. 3 illustrates a handoff-starting area in case where the ratio of power allocation for the dummy pilot of FA#2 is 0.1215.

FIG. 2 illustrates a handoff-starting area for the case where the ratio of power allocation for the dummy pilot is 0.15, and FIG. 3 illustrates a handoff-starting area for the case where the ratio of power allocation for the dummy pilot is 0.1215. From the figures, it is seen that for the dummy pilot ratio of 0.1215, the handoff-starting area for FA#1 ($HS_{FA\#1}$) more closely matches the handoff-starting area for FA#2 ($HS_{FA\#2}$) in this example.

As illustrated above, if the same power is allocated to the dummy pilot as for the standard pilot signals, the handoff area of FA#2 is increased over FA#1. However, in accordance with the invention, if the dummy pilot power ratio as derived above is used, it can be appreciated that the handoff-starting area of FA#2 is consistent with that of FA#1.

Figure 4:
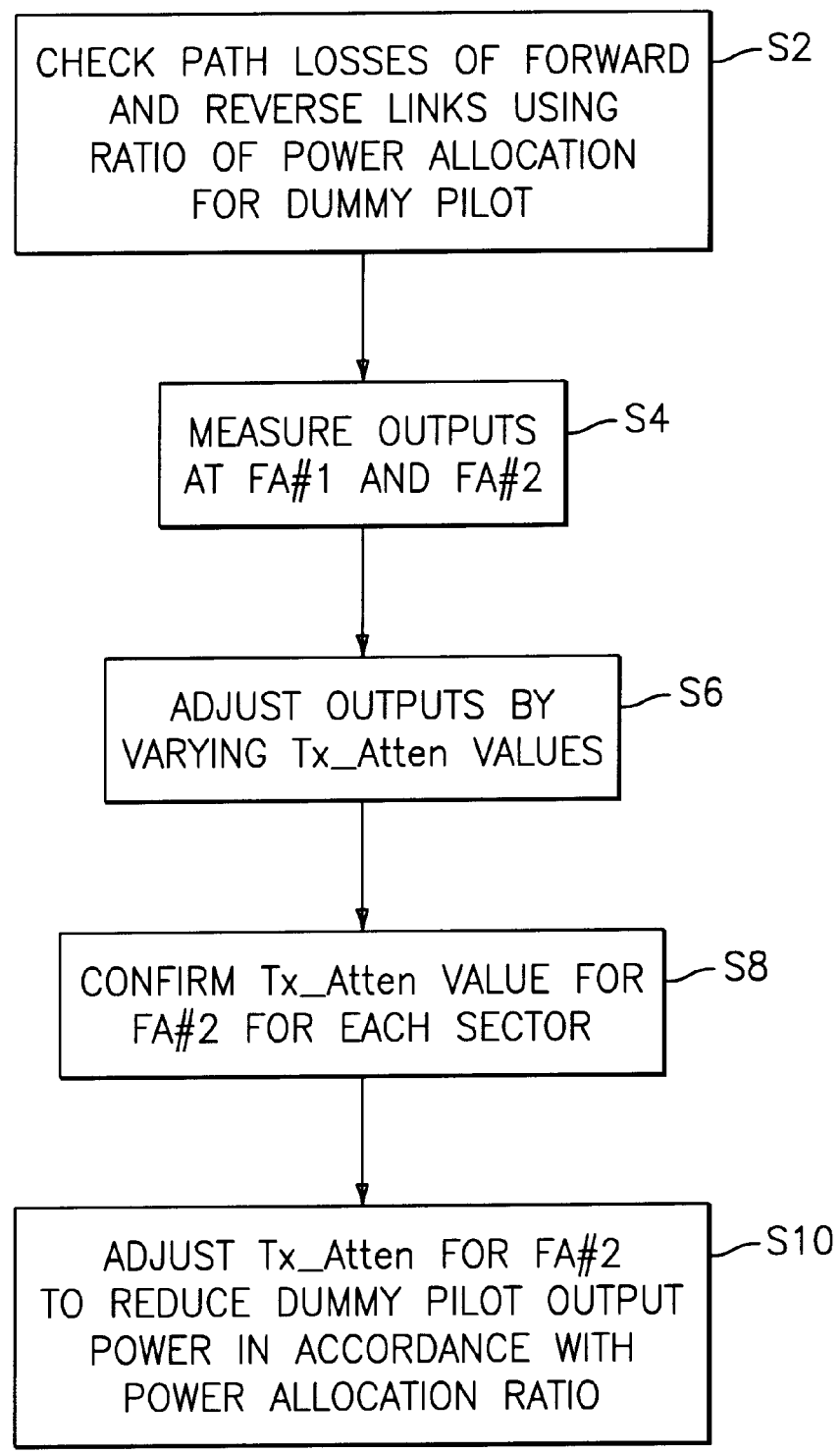
FIG. 4 is a flow chart of an illustrative method for equalizing handover boundaries for different frequencies of a multi-frequency assignment system in accordance with the invention.

By using the ratio of power allocation for the dummy pilot established above, the coverage optimization for the multi FA environment is performed according to the following steps as depicted in FIG. 4: In step S2, the path losses of the forward and reverse links are determined in a conventional manner, but using the power allocation ratio for the dummy pilot established in accordance with the above equations (1)–(3). Next, the RF power of the outputs at FA#1 and FA#2 are measured (when a subscriber does not occupy it) in step S4. If the outputs of FA#1 and FA#2 are equal in power, the outputs are adjusted by varying the Tx_Atten of FA#1 and/or FA#2 (step S6). It is noted here that "Tx_Atten" represents the value of a transmit attenuator at the base station. A different transmit attenuator is used for each frequency allocation. For base station BS1 in the illustrative embodiment, the value of Tx_Atten for FA#2 determines the RF output power of the dummy pilot, whereas Tx_Atten for FA#1 determines the RF output power for both the traffic channels and the pilot channel of FA#1.

In step S8, the Tx_Atten value for FA#2 for each sector in current operation is confirmed. The Tx_Atten value for FA#2 is then adjusted in step S10 so that the output of the dummy frequency assignment (at FA#2) is less than the output of FA#1 in accordance with the dummy pilot power allocation ratio, by as much as a predetermined amount, e.g., by about 1 dB.

From the foregoing, it will be appreciated that the present invention advantageously makes it possible to use available system resources of a common frequency assignment uniformly by determining a power allocation ratio for a dummy pilot sufficient to equalize the coverage of a common FA with the coverage of a dummy FA in multi-FA environments, particularly in two-FA system environments.

While the invention is susceptible to various modifications and alternative forms, specific embodiments thereof have been shown by way of example in the drawings and described herein in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. In a multi-frequency assignment communication system having at least first and second base stations allocated for respective geographic cells, with said first base station configured to transmit communication signals to subscriber terminals using at least a first frequency allocation (FA#1) and a second frequency allocation (FA#2), said second base station configured to transmit communication signals to subscriber terminals using FA#1 substantially more frequently than FA#2, said second base station having a dummy pilot at FA#2 which is used for handoff at FA#2, a method for equalizing coverage in said first base station at FA#1 and FA#2 comprising:

transmitting said dummy pilot with less radio frequency (RF) power than for a pilot channel at FA#1 of said second base station, and sufficient to substantially equalize a handoff boundary between said first and second cells at both FA#1 and FA#2 in an environment of more communication traffic and associated interference at FA#1 than for FA#2.

2. The method as set forth in claim 1 wherein said communication system is a code division multiple access (CDMA) system.

3. The method as set forth in claim 1 wherein pilot channel signals of said first base station at FA#1 and FA#2 are transmitted with substantially equal RF power.

4. The method as set forth in claim 1, wherein said RF power of said dummy pilot is determined in accordance with a dummy pilot power allocation ratio based on a computation of path loss $L(r_{(FA1,1)})$ of a service area of said second base station at FA#1 as follows:

$$L(r_{(FA1,1)}) = \frac{\left(\frac{E_c}{I_t}\right)N_0 W}{P_t G_c G_m \left[\xi_{pilot,(FA1,1)} - \left(\frac{E_c}{I_t}\right)\left(\frac{1}{F_1} - \xi_{pilot,(FA1,1)}\right)\right]}$$

where, $F_1$ is frequency reuse efficiency at a distance r from said second base station for FA#1, $P_t$ is base station transmit power, $G_c$ is base station antenna gain including feeder line cable loss, $G_m$ is mobile station antenna gain including feeder line cable loss, $E_c$ is energy per chip code, $I_t$ is total interference as a summation of cell interference, other cell interference and background noise, $N_0$ is thermal noise density, W is channel bandwidth, $\xi_{pilot,(FA1,1)}$ is a ratio of power allocated to a pilot channel for FA#1 in said second base station, and $E_C/I_t$ is the strength of a pilot channel signal being received from a mobile station.

5. The method as set forth in claim 4, wherein path loss of a service area of said second base station forward link for FA#2 is determined as follows:

$$L(r_{(FA2,1)}) = \frac{\left(\frac{E_c}{I_t}\right)N_0 W}{P_t G_c G_m \left[\xi_{pilot,(FA2,1)} - \left(\frac{E_c}{I_t}\right)(\xi_{pilot,(FA2,1)} + \xi_{paging} + \xi_{sync})\left(\frac{1}{F_2}\right) + \left(\frac{E_c}{I_t}\right)\xi_{pilot,(FA2,1)}\right]}$$

where $F_2$ is frequency reuse efficiency at said distance r from said second base station for FA#2, $\xi_{pilot,(FA2,1)}$ is a ratio of power allocated to the pilot channel for FA#2 in said second base station, $\xi_{paging}$ is a ratio of power allocated to a paging channel, $\xi_{sync}$ is a ratio of power allocated to a sync channel, and $E_c/I_t$ is strength of a pilot channel signal being received from a mobile station.

6. The method as set forth in claim 5, wherein a value of the dummy pilot power allocation ratio $\xi_{pilot,(FA2,1)}$ to equalize said coverage is determined as follows:

$$\xi_{pilot,(FA2,1)} = \frac{\left(1 + \frac{E_c}{I_t}\right)\xi_{pilot,(FA1,1)} - \left(\frac{E_c}{I_t}\right)\left(\frac{1}{F_1} - \frac{1}{F_2}(\xi_{paging} + \xi_{sync})\right)}{1 + \frac{E_c}{I_t} - \frac{E_c}{I_t} \cdot \frac{1}{F_2}}.$$

7. A method for optimizing coverage of a multi-frequency assignment system of a wireless communications system, so as to equalize coverage for each frequency assignment, said wireless communications system including at least first and second base stations allocated for respective geographic cells, with said first base station configured to transmit communication signals to subscriber terminals using at least a first frequency allocation (FA#1) and a second frequency allocation (FA#2), said second base station configured to transmit communication signals to subscriber terminals using said FA#1 substantially more frequently than said FA#2, said method comprising the steps of:

(a) checking paths of forward and reverse links using a power allocation ratio for a dummy pilot at FA#2 transmitted by said second base station, said dummy pilot power allocation ratio being sufficient to substantially equalize a handoff boundary between said first and second cells for handoffs at said FA#1 and FA#2;

(b) confirming a transmit attenuation value (Tx_Atten) for FA#1;

(c) reducing a value of Tx_Atten for FA#2 by a predetermined amount relative to said value of Tx_Atten for FA#1;

(d) measuring radio frequency (RF) output of FA#2;

(e) comparing the RF output value for FA#1 to said measured RF output value for FA#2;

(f) adjusting the value of Tx_Atten for FA#2 by an amount in accordance with said dummy power allocation ratio, so that RF output power for said dummy pilot is less than RF output power for a pilot channel at FA#1 of said second base station according to said dummy pilot allocation ratio, whereby said handoff boundary is substantially equalized in an environment of more communication traffic and interference at FA#1 than for FA#2.

8. The method as set forth in claim 7, wherein said communications system is a CDMA system.

9. The method as set forth in claim 7, wherein the dummy pilot power allocation ratio is based on a threshold value of pilot signal strength $E_c/I_t$ and values of frequency reuse efficiency for FA#1 and FA#2.

10. The method as set forth in claim 7, wherein path loss of service area of said second base station at FA#1 is determined as follows:

$$L(r_{(FA1,1)}) = \frac{\left(\frac{E_c}{I_t}\right)N_0 W}{P_t G_c G_m \left[\xi_{pilot,(FA1,1)} - \left(\frac{E_c}{I_t}\right)\left(\frac{1}{F_1} - \xi_{pilot,(FA1,1)}\right)\right]}$$

where, $F_1$ is frequency reuse efficiency at a distance r from said second base station for FA#1, $P_t$ is base station transmit power, $G_c$ is base station antenna gain including feeder line cable loss, $G_m$ is mobile station antenna gain including feeder line cable loss, $E_c$ is energy per chip code, $I_t$ is total interference as a summation of cell interference, other cell interference and background noise, $N_0$ is thermal noise density, W is channel bandwidth, $\xi_{pilot,(FA1,1)}$ is a ratio of power allocated to a pilot channel for FA#1 in said second base station, and $E_c/I_t$ is the strength of a pilot channel signal being received from a mobile station.

11. The method as set forth in claim 10, wherein path loss of a service area of said second base station forward link for FA#2 is determined as follows:

$$L(r_{(FA2,1)}) = \frac{\left(\frac{E_c}{I_t}\right)N_0 W}{P_t G_c G_m\left[\xi_{pilot,(FA2,1)} - \left(\frac{E_c}{I_t}\right)(\xi_{pilot,(FA2,1)} + \xi_{paging} + \xi_{sync})\left(\frac{1}{F_2}\right) + \left(\frac{E_c}{I_t}\right)\xi_{pilot,(FA2,1)}\right]}$$

where $F_2$ is frequency reuse efficiency at said distance r from said second base station for FA#2, $\xi_{pilot,(FA\ 2,1)}$ is a ratio of power allocated to the pilot channel for FA#2 in said second base station, and $E_c/I_t$ is strength of a pilot channel signal being received from a mobile station.

12. The method as set forth in claim 11, wherein a value of the dummy pilot power allocation ratio $\xi_{pilot,(FA\ 2,1)}$ to equalize said coverage is determined as follows:

$$\xi_{pilot,(FA2,1)} = \frac{\left(1 + \frac{E_c}{I_t}\right)\xi_{pilot,(FA1,1)} - \left(\frac{E_c}{I_t}\right)\left(\frac{1}{F_1} - \frac{1}{F_2}\right)(\xi_{paging} + \xi_{sync})}{1 + \frac{E_c}{I_t} - \frac{E_c}{I_t} \cdot \frac{1}{F_2}}.$$

13. The method as set forth in claim 12, wherein an environment to calculate the ratio of pilot power allocation for said FA#2 includes a cell radius of 3000 m, a maximum base station transmit power of 25 W, a ratio of pilot power allocation for FA#1 of 0.15, a ratio of dummy paging power allocation for FA#1 and FA#2 of $0.63\times\xi_{pilot,(FA1,1)}=0.0945$, a ratio of sync power allocation for FA#1 and FA#2 of $0.20\times\xi_{pilot,(FA1,1)}=0.30$, T_ADD=−15 dB, and a full loading condition.

* * * * *